(12) United States Patent
Hawley

(10) Patent No.: US 12,496,980 B2
(45) Date of Patent: Dec. 16, 2025

(54) STORAGE SYSTEMS

(71) Applicant: Toyota Motor Engineering & Manufacturing North America, Inc., Plano, TX (US)

(72) Inventor: Thomas S. Hawley, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 18/173,423

(22) Filed: Feb. 23, 2023

(65) Prior Publication Data

US 2024/0286558 A1 Aug. 29, 2024

(51) Int. Cl.
*B60R 9/06* (2006.01)

(52) U.S. Cl.
CPC .................................. *B60R 9/065* (2013.01)

(58) Field of Classification Search
CPC . B60R 7/04; B60R 9/065; B60R 11/00; B60J 7/141; B60J 7/14; B60J 7/1607; B60J 7/1614; B60J 7/1621; B60J 7/11; B60P 7/02; B60P 7/06
USPC ..... 296/37.1, 37.5, 37.6, 37.7, 37.8, 100.06, 296/100.08, 100.09, 100.14, 100.17; 224/403, 404, 538
See application file for complete search history.

(56) References Cited

U.S. PATENT DOCUMENTS

| | | | | |
|---|---|---|---|---|
| 4,844,305 | A * | 7/1989 | McKneely | B60R 11/06 312/122 |
| 5,372,289 | A * | 12/1994 | Dachicourt | B60R 7/02 224/538 |
| 6,325,439 | B1 * | 12/2001 | Crossman | B60R 9/00 296/100.09 |
| 6,435,586 | B2 | 8/2002 | Getzschman et al. | |
| 6,634,691 | B2 * | 10/2003 | Henderson | B60J 7/141 296/100.06 |
| 6,899,372 | B1 * | 5/2005 | Keller | B60J 7/141 296/100.1 |
| 6,929,303 | B1 | 8/2005 | Sharples | |
| 8,544,708 | B2 * | 10/2013 | Maimin | B60R 11/06 224/404 |
| 8,757,695 | B2 * | 6/2014 | Dinger | B60R 7/02 296/37.5 |
| 9,676,339 | B2 | 6/2017 | Huebner et al. | |
| 9,902,329 | B2 * | 2/2018 | Izydorek | B60R 9/055 |
| 10,745,064 | B2 | 8/2020 | DeLong et al. | |
| 11,529,854 | B1 * | 12/2022 | Williams | B60R 9/065 |

(Continued)

FOREIGN PATENT DOCUMENTS

CN 211075691 U 7/2020

*Primary Examiner* — Joseph D. Pape
*Assistant Examiner* — Veronica M Condo
(74) *Attorney, Agent, or Firm* — Dinsmore & Shohl LLP

(57) ABSTRACT

A storage system for a vehicle is provided. The storage system includes a cover including a section operable to move between a folded position and an unfolded position, a crossmember disposed on an underside of the section, and a rail system disposed on the underside of the cover and configured to slidably support a bin. The crossmember obstructs sliding movement of the bin when the section is in the unfolded position, and the crossmember allows sliding movement of the bin when the section is in the folded position.

10 Claims, 4 Drawing Sheets

(56) References Cited

U.S. PATENT DOCUMENTS 12,187,228 B2 \* 1/2025 Otero ........................ B60R 7/02
2020/0086808 A1 \* 3/2020 Linn ....................... B60R 9/065

\* cited by examiner

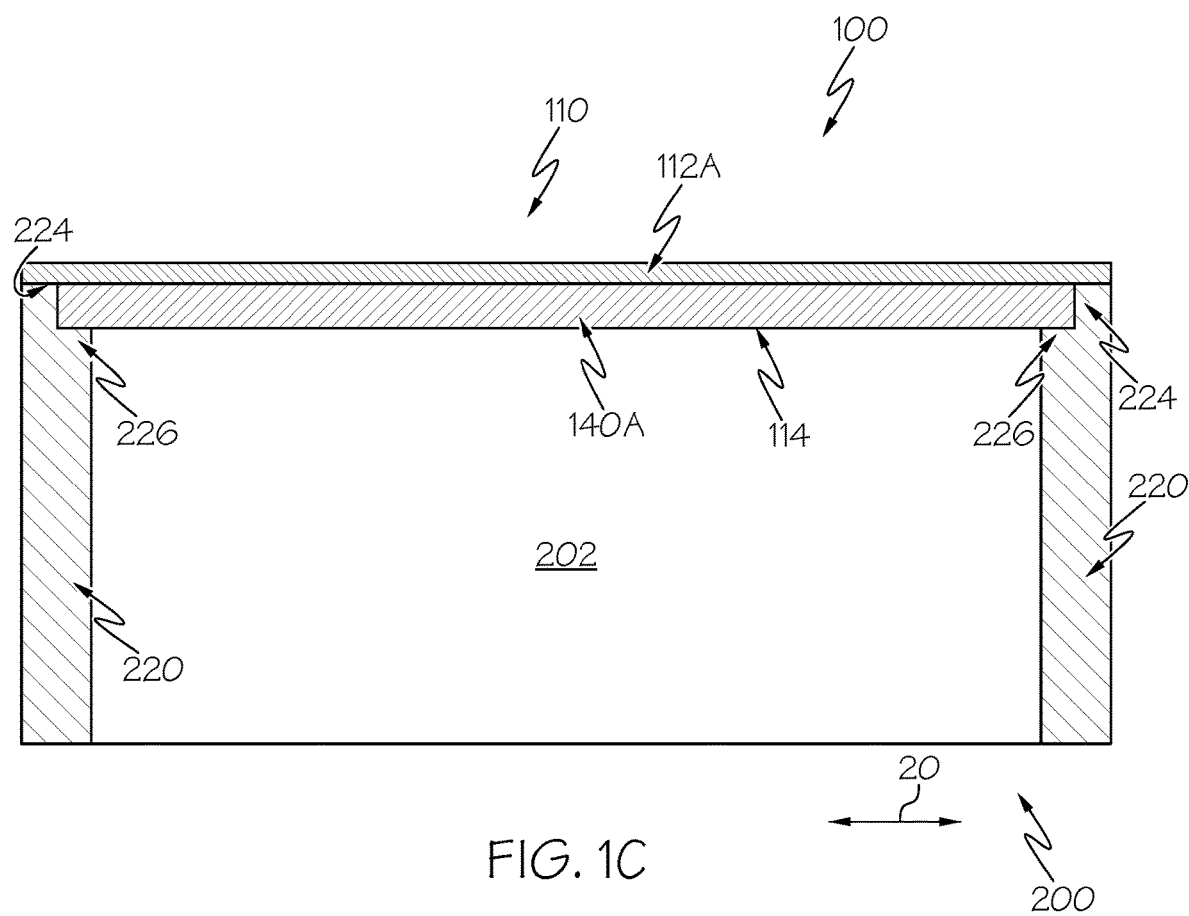

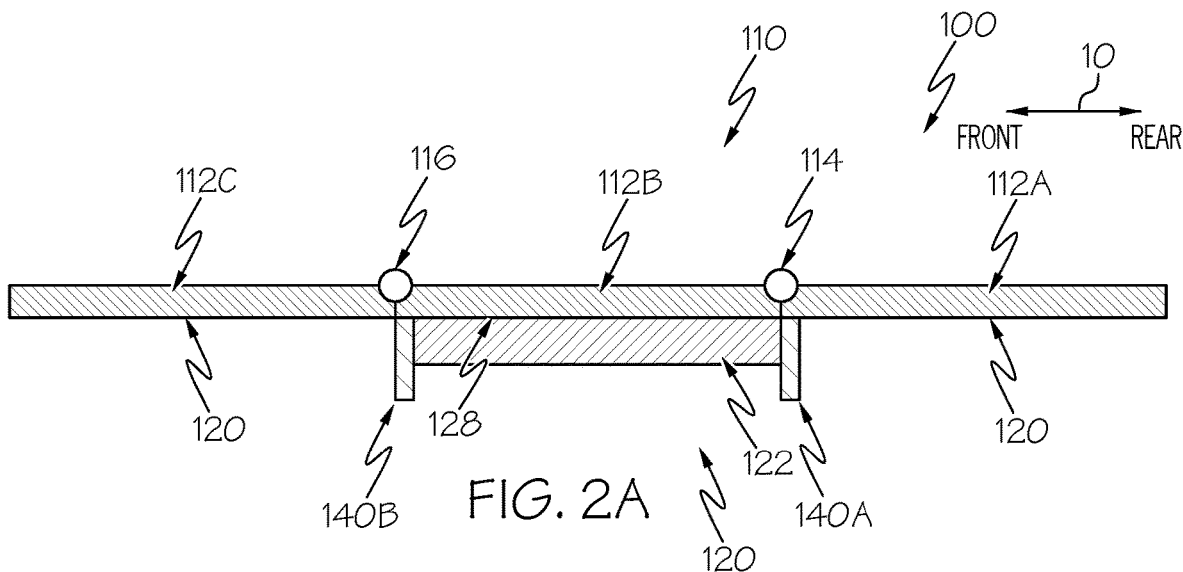
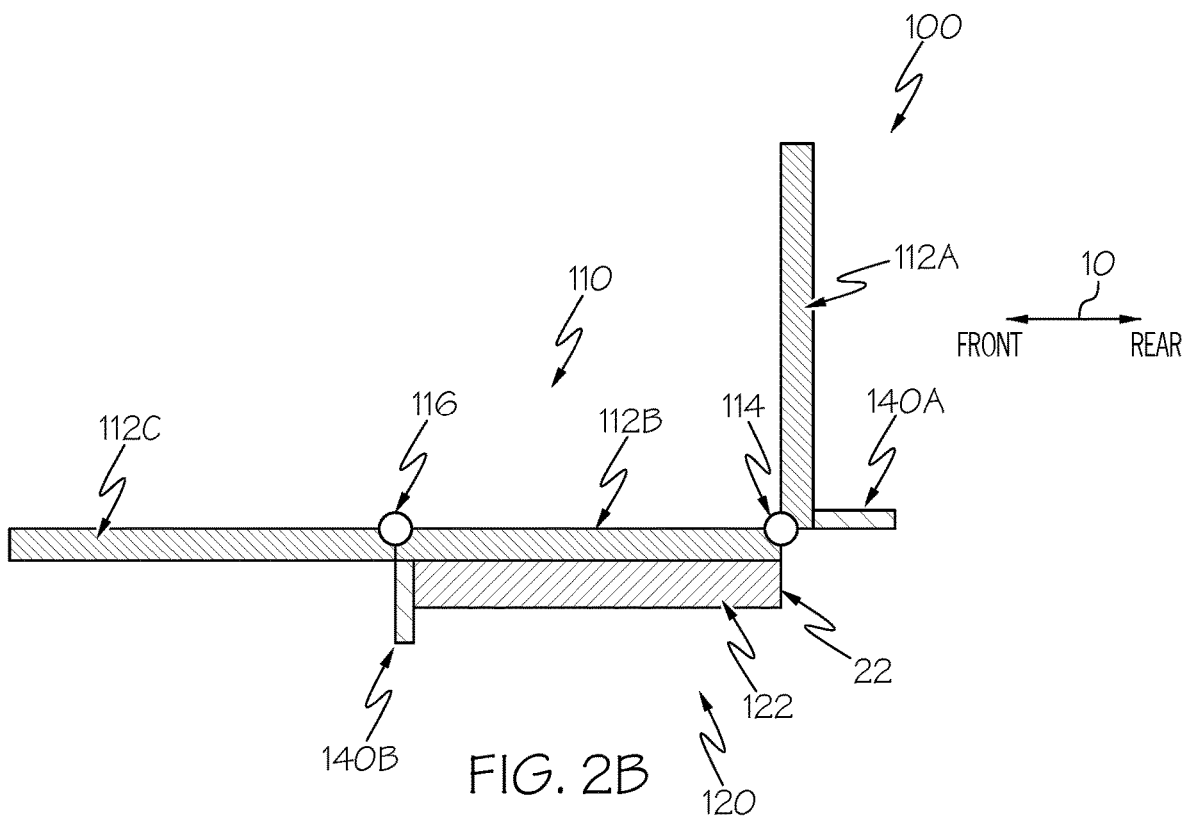

STORAGE SYSTEMS

TECHNICAL FIELD

The present specification generally relates to storage systems and more specifically, storage systems for vehicles.

BACKGROUND

Various storage systems for vehicles are used to store items. Items are often placed in a luggage compartment or a truck bed of a vehicle. However, the items may roll, slide, or otherwise move with the movement of the vehicle.

SUMMARY

In one embodiment, a storage system for a vehicle is provided. The storage system includes a cover including a section operable to move between a folded position and an unfolded position, a crossmember disposed on an underside of the section, and a rail system disposed on the underside of the cover and configured to slidably support a bin. The crossmember obstructs sliding movement of the bin when the section is in the unfolded position, and the crossmember allows sliding movement of the bin when the section is in the folded position.

In another embodiment, a vehicle is provided. The vehicle includes a storage system including a cover including a section operable to move between a folded position and an unfolded position, a crossmember disposed on an underside of the section and a rail system disposed on the underside of the cover and configured to slidably support a bin. The crossmember obstructs sliding movement of the bin when the section is in the unfolded position, and the crossmember allows sliding movement of the bin when the section is in the folded position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1C depicts a cross sectional view of the storage system taken along the line 1C-1C of FIG. 1A according to one or more embodiments shown and described herein;

FIG. 2A depicts a schematic side view of the storage system when all sections of the cover are in unfolded position according to one or more embodiments shown and described herein;

FIG. 2B depicts a schematic side view of the storage system when one section of the cover is in a folded position according to one or more embodiments shown and described herein;

DETAILED DESCRIPTION

FIG. 1 generally depicts one embodiment of a storage system for storing items. The storage system may be disposed on a storage space of a vehicle. For example, the storage system may be disposed on a truck bed of a truck (e.g., a pickup truck). The storage system may include a cover (e.g., a tonneau cover or the like) to cover the storage space. The cover may be sectionalized with sections that are foldable. The storage system includes a crossmember underneath the cover to reinforce the storage system to carry items with a rail system. The rail system slidably supports a bin under the cover. The crossmember is configured to obstruct sliding movement of the bin when the bin is moved may be due to the vehicle movement. The rail system may have an engagement portion where a stopper is engageable to further restrict the movement of the bin.

Figure 1A:
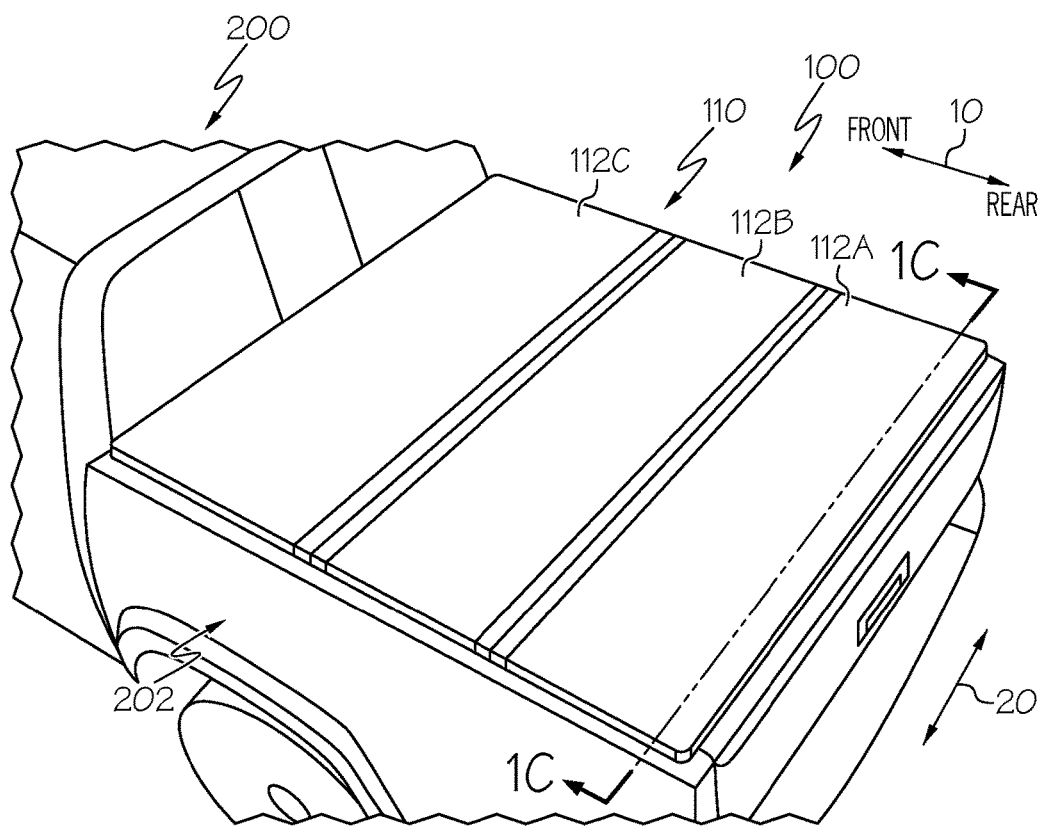
FIG. 1A depicts a perspective view of a storage system disposed on a vehicle storage space according to one or more embodiments shown and described herein.

Referring now to FIG. 1A, a storage system 100 for a vehicle 200 is depicted. The storage system 100 may be disposed in a storage space 202 of a vehicle 200. The storage system 100 includes a cover 110 including a section 112A operable to move between a folded position and an unfolded position. The section 112A in FIG. 1A is in the unfolded position. When folded, the section 112A may be lifted up away from the storage space 202 of the vehicle 200. In embodiments, the cover 110 may have one section (e.g., the section 112A) that is foldable in a first direction 10 (e.g., a longitudinal direction of the vehicle 200). In embodiments, the cover 110 may further include more than one section (e.g., two or more of the sections 112A, 112B, 112C). In embodiments, the cover 110 may be sectionalized in equal length. For example, the sections 112A, 112B, 112C may have the same length in the first direction 10 (e.g., the longitudinal direction of the vehicle 200). In embodiments, the cover 110 may be sectionalized in unequal length. For example, the cover 110 may have one section shorter than other section in the first direction 10. It is noted that the number of sections is not limited to one, two, or three as discussed above, but may be four or more. In embodiments, the storage system 100 may be removed from the vehicle 200, and the storage space 202 of the vehicle 200 may be used in its original condition without the storage system 100.

Figure 1B:
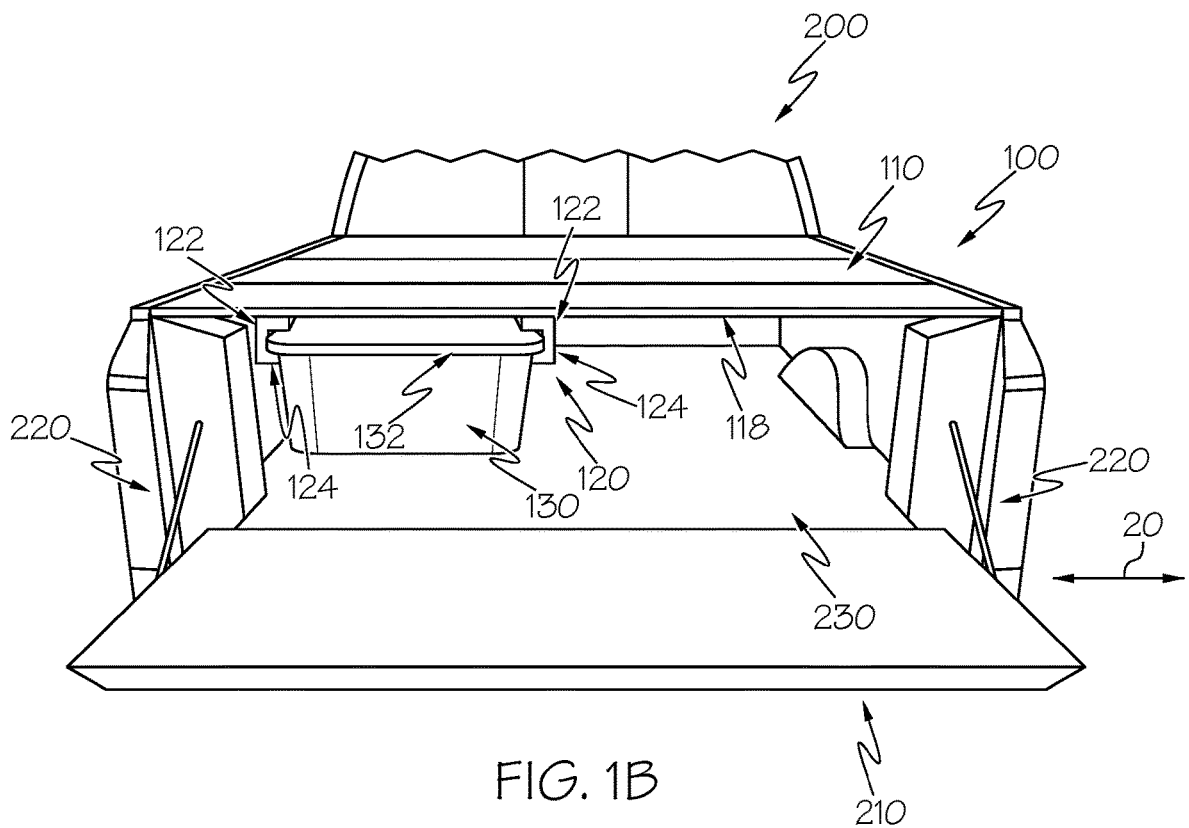
FIG. 1B depicts a rear view of the storage system showing a bin and a rail system of the storage system of FIG. 1A according to one or more embodiments shown and described herein.

Referring to FIG. 1B, a tailgate 210 of the vehicle 200 is opened to show the structure of the storage system 100. The storage system 100 includes a rail system 120 disposed on an underside 118 of the cover 110. The rail system 120 is configured to slidably support a bin 130. The bin 130 is configured to store one or more items inside. In embodiments, the rail system 120 includes one or more rails 122 extending in a second direction 20 (e.g., a lateral direction of the vehicle 200) perpendicular to the first direction 10. The rails 122 may have a supporting portion 124 (e.g., a channel or the like) to support a portion of the bin 130. For example, the bin 130 may have a portion 132 (e.g., a lip, a rim, an edge, a handle, or the like) that may be supported by the supporting portion 124 such that the bin 130 may be slidable along the rails 122. It is noted that the rail system 120 may have only one rail or more rails depending on the shape and size of a bin to be supported. Also, it is noted that the rail system 120 may support one or more bins in the same size and/or shape or various sizes and/or shapes. When the tailgate 210 is closed, the tailgate 210 may become or be integrated into a part of the storage system 100 as a stopper for the bin 130 by obstructing the movement of the bin 130 when the bin 130 is slid along the rails 122.

FIG. 1C shows a cross sectional view of the storage system 100 and sides 222 of the storage space 202 of the vehicle 200 taken along a reference line 1C-1C in FIG. 1A. The cover 110 may be supported by the vehicle 200. For example, the cover 110 may be supported by top portions 224 of the sides 222. The storage system 100 includes a crossmember 140A disposed on an underside of the cover 110 (e.g., the crossmember 140A disposed under the section 112A). The crossmember 140A may extend in the first direction 10 along the section 112A. The crossmember 140A may be supported by the vehicle 200. For example, the crossmember 140A may be supported by step portions 226 of the sides 222. The crossmember 140A may reinforce the storage system 100 to carry additional weight.

Referring to FIG. 2A, all the sections 112A, 112B, 112C of the cover 110 are in the unfolded position. In embodiments, the rail system 120 may be disposed under one or more of the sections 112A, 112B, 112C. For example, the rail system 120 may be disposed under the section 112B on an underside 12B of the section 112B. The rails 122 of the rail system 120 may be fit within a length of the section 112B in the first direction 10. The bin 130 may be supported by the rail system 120 under the section 112B. It is noted that the rail system 120 may be disposed all or some of the sections 112A, 112B, 112C. In embodiments, the cover 110 includes hinges 114, 116 to allow the sections 112A, 112B, 112C to be operable to move between the folded position and the unfolded position. For example, the hinges 114, 116 may be conventional hinges, such as a butt hinge, a T-hinge, a strap hinge, or the like. The hinges 114, 116 may be reinforced or covered. The hinge 114 may be disposed between the section 112A and the section 112B to rotatably support the section 112A with respect to the section 112B. The hinge 116 may be disposed between the section 112B and the section 112C to rotatably support the section 112B with respect to the section 112C.

The crossmember 140A is disposed on an underside 12A of the section 112A (e.g., a first section). The crossmember 140A (e.g., a first crossmember) obstructs sliding movement of the bin 130 when the section 112A is in the unfolded position. For example, the crossmember 140A obstructs the sliding movement of the bin 130 in a direction toward a rear side of the vehicle 200. In embodiments, the section 112B (e.g., a second section) may include a crossmember 140B (e.g., a second crossmember) disposed on an underside 12B of the section 112B. The crossmember 140B obstructs sliding movement of the bin 130. For example, the crossmember 140B obstructs the sliding movement of the bin 130 in a direction toward a front side of the vehicle 200.

Referring to FIG. 2B, the section 112A is in the folded position. When the section 112A is in the folded position, the crossmember 140A allows sliding movement of the bin 130 thereby allowing access to the bin 130. Since the crossmember 140A is disposed on the underside 12A the crossmember 140A is moved together with the section 112A, and therefore the crossmember 140A is moved away from the rail system 120. The crossmember 140A no longer obstructs an end portion 22 of the rail 122 when the section 112A is folded, and the bin 130 may be slide out from the rail 122 and be retrieved from the storage system 100.

Figure 3A:
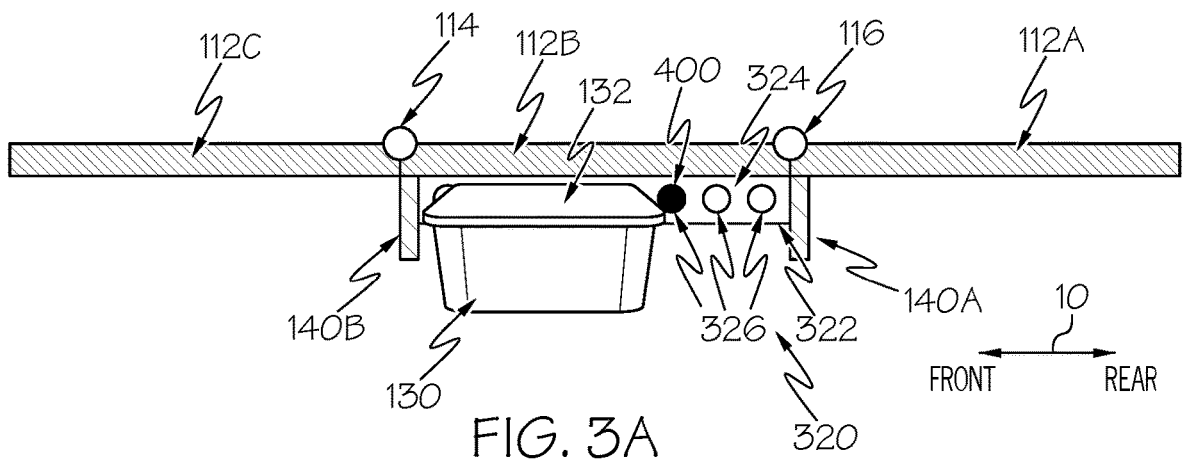
FIG. 3A depicts a schematic side view of a storage system with a rail system having an engagement portion according to one or more embodiments shown and described herein.
Figure 3B:
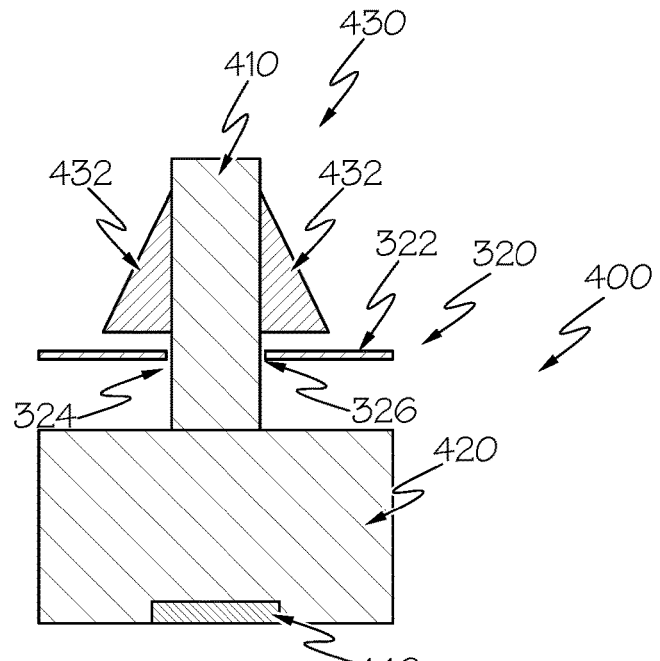
FIG. 3B depicts a schematic side view of a stopper being engaged with the storage system of FIG. 3A according to one or more embodiments shown and described herein.

FIG. 3A shows a rail system 320 which is similar to the rail system 220 and therefore detailed descriptions of the same or similar features are omitted. The rail system 320 includes an engagement portion 324 configured to be engaged with a stopper 400 (FIG. 3B). The engagement portion 324 may include a plurality of holes 326 selectively engageable with the stopper 400. The plurality of holes 326 are disposed along the rail 322 in the first direction 10. When the bin 130 is smaller than the section 112B (e.g., when a length of the bin 130 in the first direction 10 is shorter than the length of the section 112B in the first direction 10), the bin 130 may slide along the rail 322 between the crossmember 140A and the crossmember 140B. The stopper 400 may be engaged with the engagement portion 324 to obstruct the movement (e.g., sliding movement, or the like) of the bin 130. For example, the stopper 400 may be inserted in one of the plurality of holes 326 of the engagement portion 324 to restrict the movement of the bin 130. The distance between the crossmember 140B and the stopper 400 may set to be substantially the same with the length of the bin 130 in the first direction 10 to tightly secure the bin 130. In embodiments, the engagement portion may include a slot, a notch, or the like to be engaged with the stopper 400.

Referring to FIG. 3B, the stopper 400 may include a locking system 430 configured to lock the stopper 400 in position when being engaged with the engagement portion 324 of the rail system 320. In embodiments, the stopper 400 have a body portion 410 configured to be inserted into the holes 326. The stopper 400 may have a head portion 420 at one end of the body portion 410. The dimension of the body portion 410 may be sized to be inserted into the holes 326. For example, the body portion 410 may be substantially the same or smaller than the size of the holes 326 in diameter or in width. The locking system 430 may include one or more fins 432 which are deployable from and retractable into the body portion 410. The fins 432 may be tapered in a direction the stopper 400 is inserted into the holes 326. When being inserted, the fins may be retracted in the body portion 410 so that the body portion 410 can be moved through one of the holes 326. Once the body portion 410 is inserted in one of the holes 326 and the fins 432 are passed one of the holes 326, the fins 432 may be deployed to lock the stopper 400 in position. The fins 432 may be biased toward a deployed position, and pushing the stopper 400 through one of the holes 326 may push the fins 432 toward a retracted position. In embodiments, the fins 432 may be retracted when a button 440 is pressed. The stopper 400 may be locked in position while movement of the stopper 400 is obstructed between the fins 432 and the head portion 420.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage system for a vehicle comprising:
a cover including a first section and a second section, the first section operable to move between a folded position and an unfolded position;
a crossmember disposed on an underside of the first section; and
a rail system disposed on the underside of the second section and configured to slidably support a bin,
wherein the crossmember obstructs sliding movement of the bin when the first section is in the unfolded position, and the crossmember allows sliding movement of the bin when the first section is in the folded position.

2. The storage system of claim 1, wherein the first section is configured to fold in a first direction, the crossmember extends in a second direction perpendicular to the first direction along the first section, and the rail system includes one or more rails that extend in the first direction.

3. The storage system of claim 1, wherein the first section is configured to fold in a first direction, and the rail system includes one or more rails fit within a length of the second section in the first direction.

4. The storage system of claim 1, wherein
the crossmember includes a first crossmember disposed on the first section and a second crossmember disposed on the second section.

5. The storage system of claim 1, wherein the rail system includes an engagement portion configured to be engaged with a stopper, and the stopper is configured to obstruct sliding movement of the bin when engaged with the engagement portion.

6. The storage system of claim 5, wherein the engagement portion includes a plurality of holes selectively engageable with the stopper.

7. The storage system of claim 5, wherein the stopper includes a locking system configured to lock the stopper in position when being engaged with the engagement portion.

8. A vehicle comprising:
a storage system comprising:
a cover including a first section and a second section, the first section operable to move between a folded position and an unfolded position;
a crossmember disposed on an underside of the first section; and
a rail system disposed on the underside of the second section and configured to slidably support a bin,
wherein the crossmember obstructs sliding movement of the bin when the first section is in the unfolded position, and the crossmember allows sliding movement of the bin when the first section is in the folded position.

9. The vehicle of claim 8, wherein the first section is configured to fold in a longitudinal direction of the vehicle.

10. The vehicle of claim 8, further comprising:
a frame configured to support the crossmember at both end portions of the crossmember in a lateral direction of the vehicle.

* * * * *